Feb. 23, 1943.   C. SCHMUTZER ET AL   2,312,288
PURGING AIR FROM CARBONATED BEVERAGE CONTAINERS
Filed May 27, 1939   5 Sheets-Sheet 1
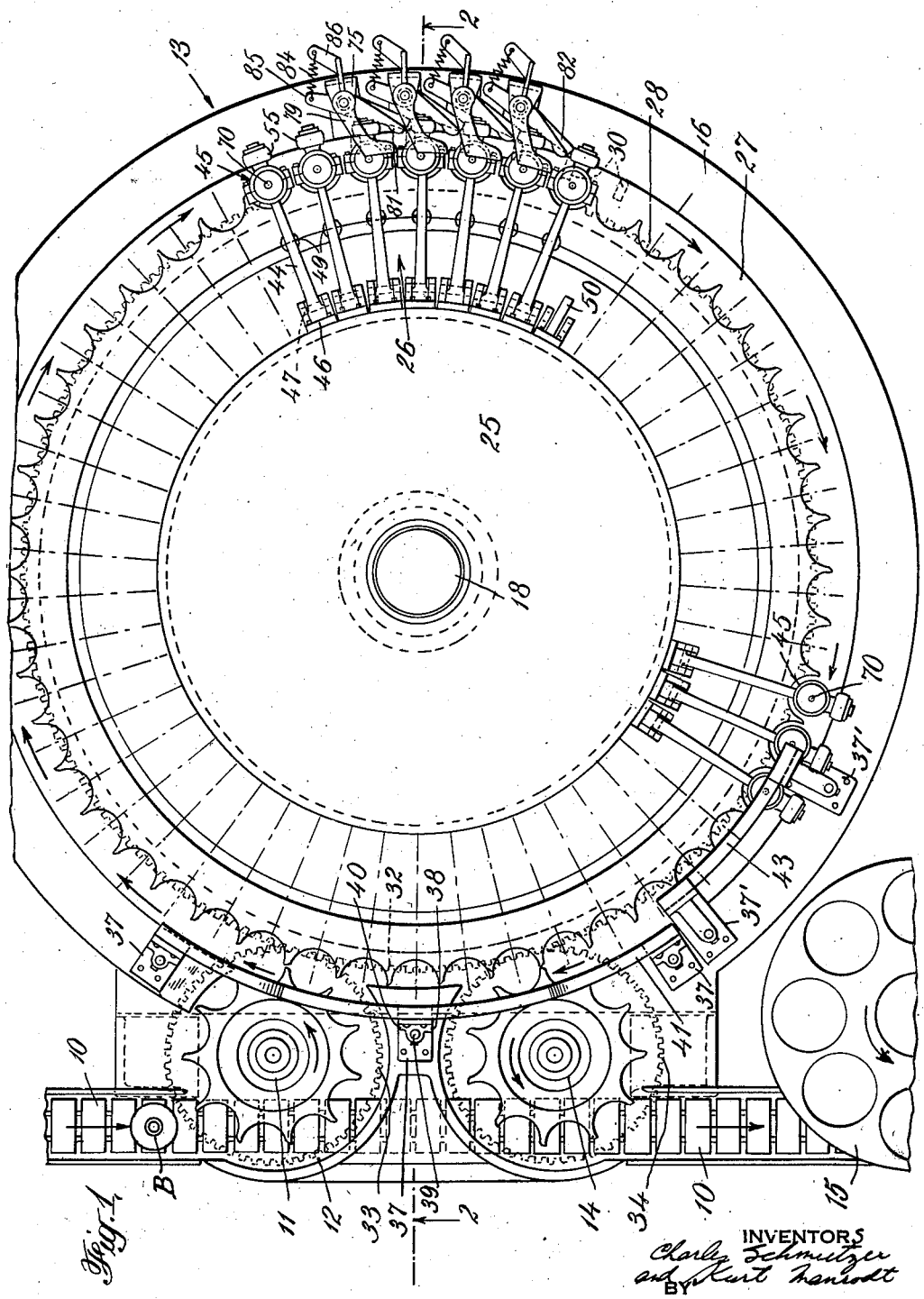
INVENTORS
Charly Schmutzer
and Kurt Hanrodt
BY
Abquet, Neave & Campbell
ATTORNEYS

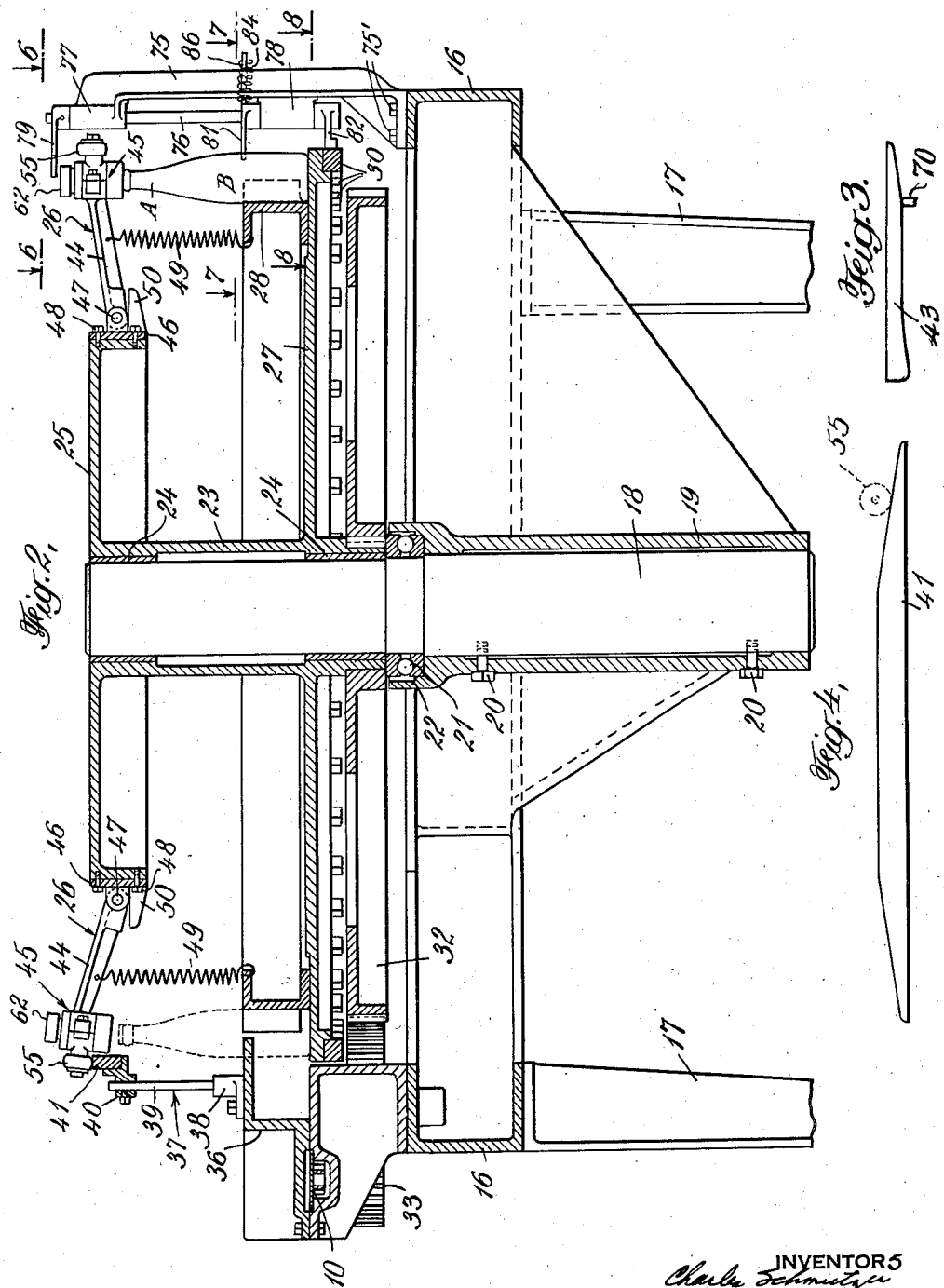

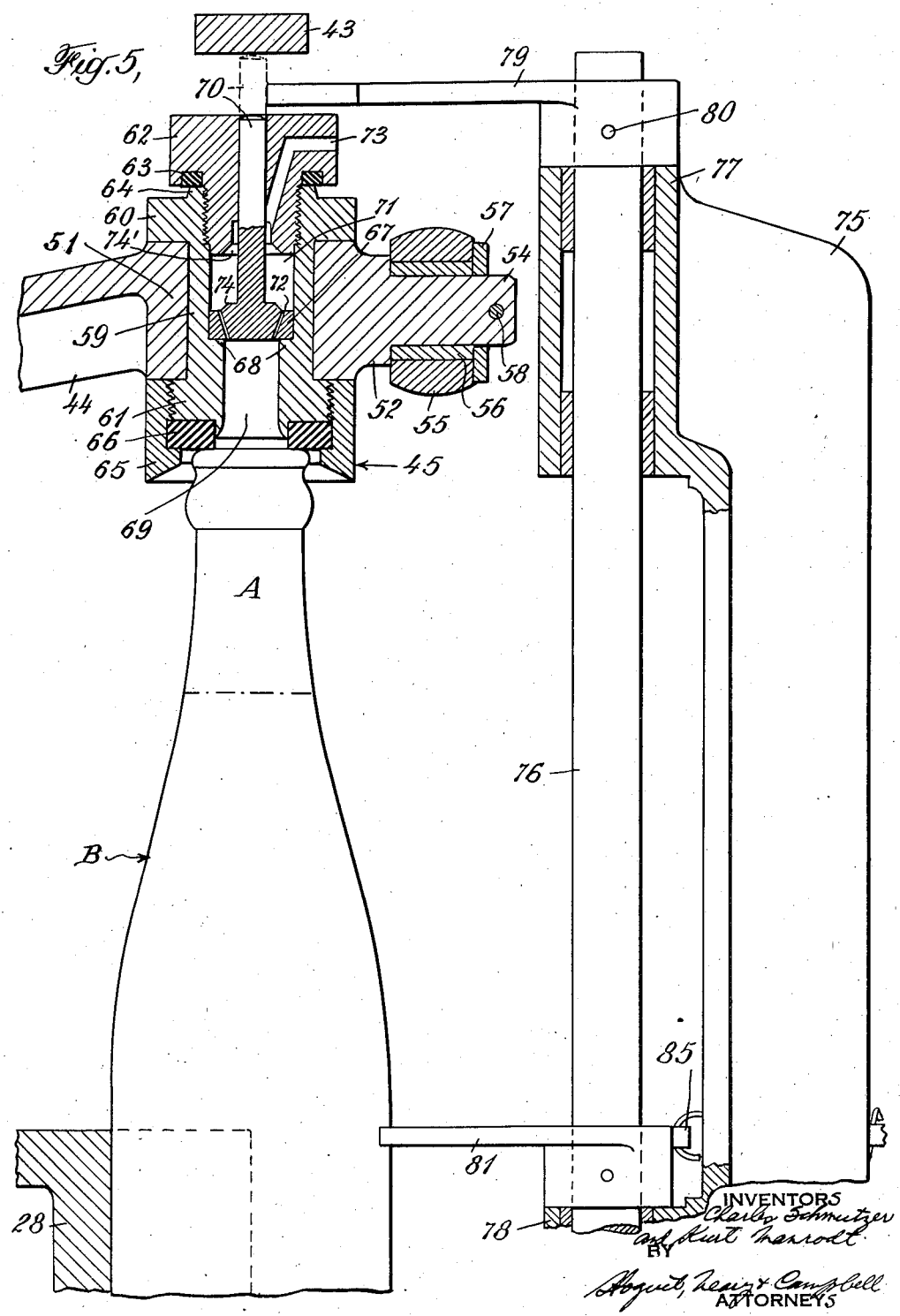

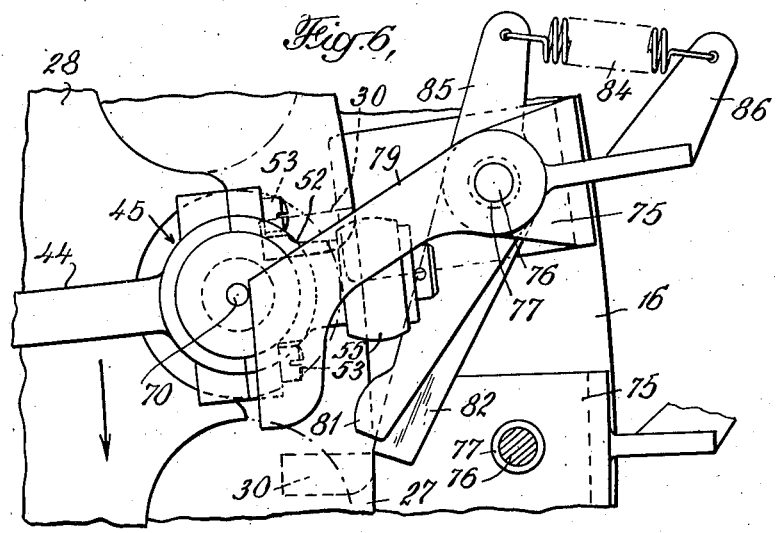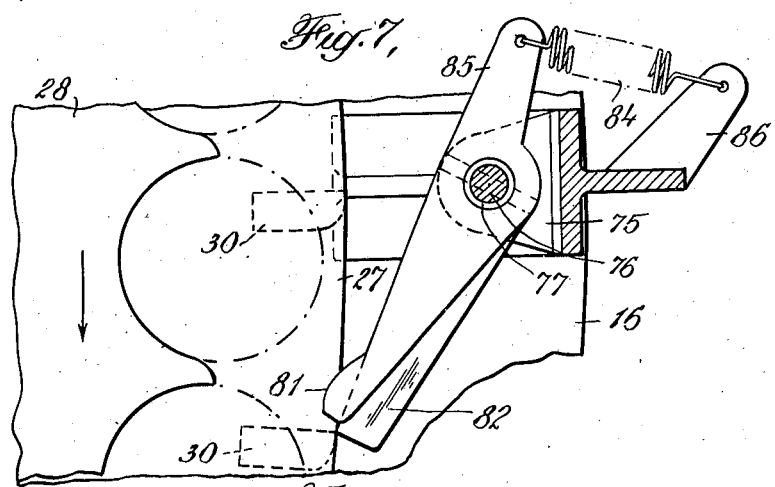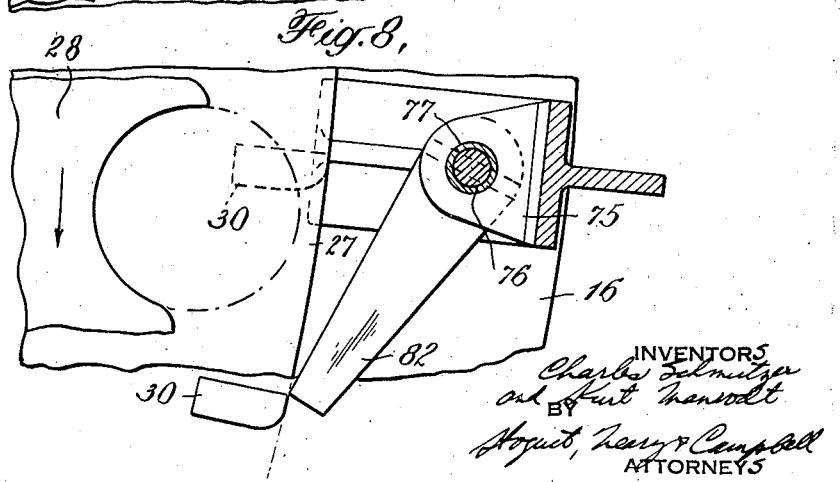

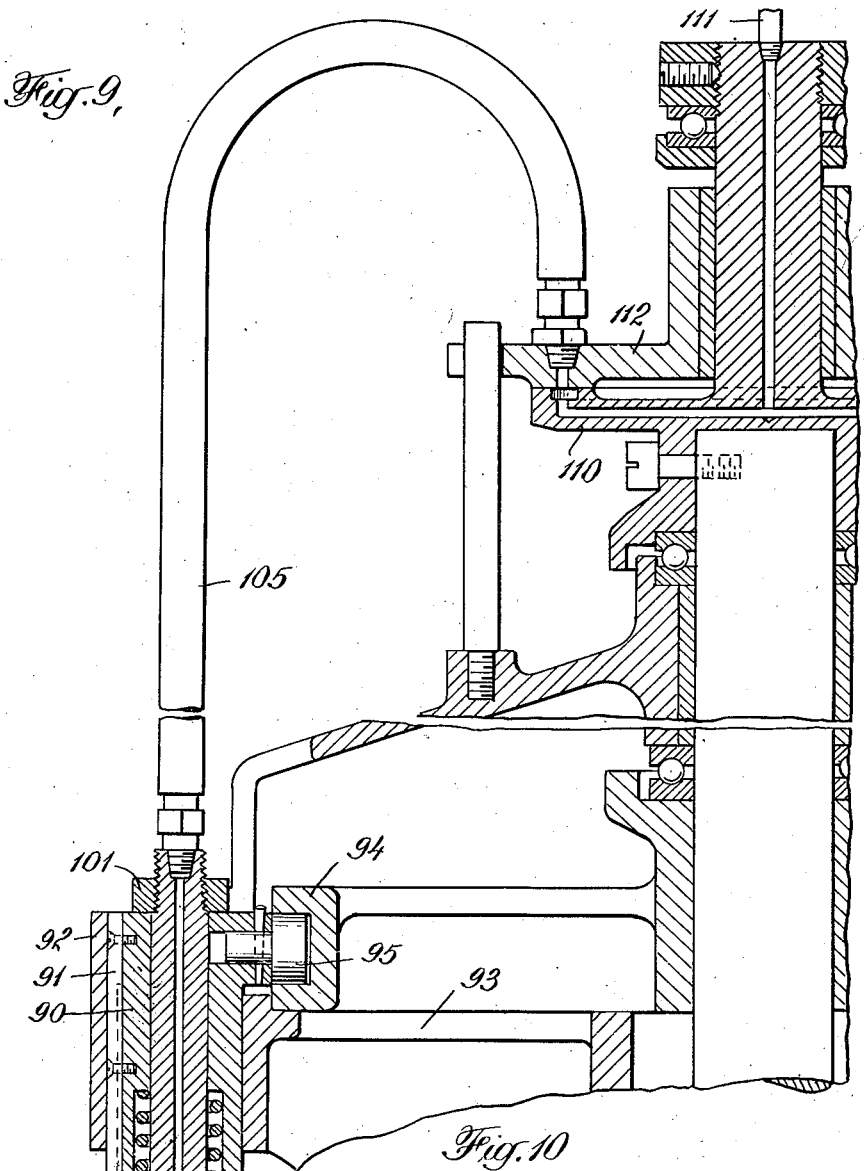
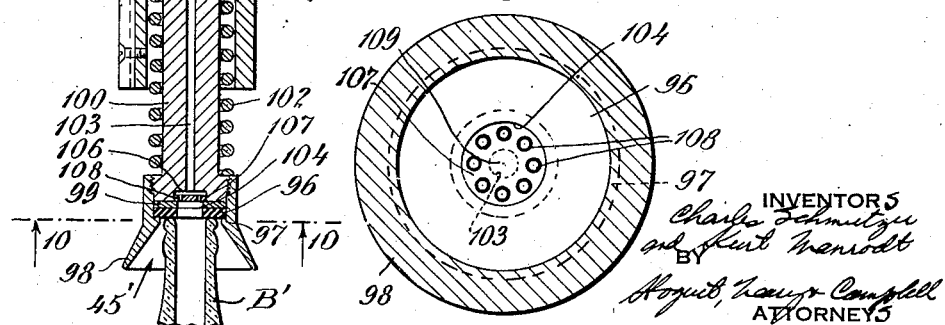

UNITED STATES PATENT OFFICE 2,312,288

PURGING AIR FROM CARBONATED BEVERAGE CONTAINERS

Charles Schmutzer, Irvington, and Kurt Manrodt, Newark, N. J., assignors to Hoffman Beverage Company, Newark, N. J., a corporation of New Jersey Application May 27, 1939, Serial No. 276,256

18 Claims. (Cl. 226—82)

This invention relates to an improved method and apparatus for purging air from receptacles containing gas-charged liquids; more particularly a method of inducing and controlling the formation of an air-displacing foam in the neck portion of carbonated beverage containers.

In the manufacture of packaged carbonated fruit-flavored or cereal beverages, the presence of air between the liquid surface and the seal of the container has been found to affect the flavor of the beverage through oxidation of the organic contents thereof. This undesirable flavor change becomes particularly noticeable when the bottled beverage is pasteurized, the oxidation being apparently accelerated by the heat treatment. Among the methods that have been attempted to purge the air from above the beverage in the container prior to sealing it are squirting jets of the beverage into the bottle neck to promote foaming, injecting carbon dioxide gas into the neck to displace the air, and the like, but these are wasteful and not entirely successful. Another method of eliminating the air includes jarring the container after filling and before sealing to liberate sufficient carbon dioxide from the liquid to cause foam, which displaces the air from the neck of the container, which is then sealed. This method has been found to be successful, but where the beverage is highly carbonated, the degree of foaming is sometimes difficult to control because the entire body of the beverage is agitated, and the jarring action not infrequently results in overfoaming with consequent waste of the beverage.

In accordance with the present invention, an effective method and apparatus are provided for controlling the air-displacing foam produced by the gas in the liquid for the purpose of purging the air from the space above the liquid level of partly filled containers of carbonated beverages prior to sealing them.

More specifically, a container, such as a bottle or can, partly filled with the carbonated beverage, such as ginger ale, beer, soda water, or the like, is temporarily capped by a head containing a member actuated by foam rising in the container. The contents of the bottle are then so treated by foam-inducing means that a part of the gas therein is released to form foam, which rises to the mouth of the bottle, thus displacing the air in the neck of the bottle. For example, the foam-inducing means may be a series of agitating mechanisms which successively gently disturb the contents of the bottle sufficiently to effect sufficient foaming to the bottle mouth. Other foam-inducing means may be employed with equal facility.

The head contains a plunger having small holes through which the air escapes as it is purged by the foam, these holes being of a size such that the rising foam clogs them, causing the continuing foam to create a pressure which raises the plunger. The movement of the plunger is utilized to arrest the foam-inducing means to stop the production of more foam. In the case of the agitating mechanisms described, the plunger disables the next successive mechanisms, so that they do not agitate the contents of the bottle. The pressure in the neck of the bottle also acts on the liquid surface of the contents to prevent further liberation of carbon dioxide from the beverage so that by the time the head is raised from the bottle preparatory to the final capping operation, the contents are quieted sufficiently so that a minimum of carbon dioxide escapes from solution.

In a modification of the invention, the head, which engages the mouth of the bottle to temporarily cap the same, is connected to a source of suction so that not only is a large proportion of the air withdrawn from the space above the liquid in the bottle, but the reduced pressure on the liquid causes the release of carbon dioxide therefrom so that foaming is induced. The perforated foam-responsive plunger in the head has an imperforate portion opposite the suction opening, so that when the holes in the disc are clogged the suction raises the disc and seals the suction opening, thereby automatically stopping the foam-inducing suction and inhibiting further foaming. The head is then released from the bottle and, while the foam still extends to the lip thereof, the bottle is permanently sealed.

It will be seen that the method and apparatus of this invention provide a very simple and effective means for purging air from the top of a container partially filled with a gas-containing liquid, such as a carbonated beverage, by inducing foaming thereof and controlling the foaming by means of the foam, so that the complete purging of the air uniformly from all containers is effected without loss of the beverage due to overfoaming.

A more complete understanding of the details of the invention may be had by reference to the accompanying drawings, wherein:

Figure 1 is a partial diagrammatic plan view of the apparatus of this invention, with conventional bottle feeding and discharge turrets;

Fig. 2 is a vertical section therethrough as seen along the line 2—2 of Fig. 1;

Figs. 3 and 4 are developments of cams adapted for use therewith;

Fig. 5 is an enlarged vertical section through the foam control head and the means for controlling the foam-inducing mechanism;

Fig. 6 is an enlarged plan view of the foam-inducing mechanism and foam control head as seen along the line 6—6 of Fig. 2;

Fig. 7 is an enlarged plan view of the foam-inducing mechanism as seen partly in section along the line 7—7 of Fig. 2;

Fig. 8 is an enlarged plan of the cocking lever for the foam-inducing mechanism as seen partly in section along the line 8—8 of Fig. 2;

Fig. 9 is an axial section through a modified form of the invention, involving the use of suction for inducing the foaming of the beverage; and, Fig. 10 is an enlarged cross-section therethrough as seen along the line 10—10 of Fig. 9, and illustrating the perforated foam-responsive disc.

Referring to Fig. 1 of the drawings, containers, such as bottles B, after being partially filled with a carbonated beverage by a conventional machine or the like, not shown, are supplied by a conveyor 10 to a rotary inlet turret 11 of conventional design which transfers the bottles B over its table 12 to the foam-control machine 13, which rotates in synchronism with turret 11 in clockwise direction as shown by the arrows in Fig. 1. Each bottle B is carried by machine 13 for practically one rotation thereof to a conventional rotary discharge turret 14 which receives the bottles and transfers them to conveyor 10 leading to a conventional capping or sealing machine 15 rotating in synchronism with the turret 14.

As shown in Fig. 2, foam-control machine 13 comprises a base plate 16 mounted on suitable supports 17, and carrying shaft 18 fixed within hub 19 by bolts 20. A thrust bearing 21 is positioned within hub flange 22 and supports the weight of spider 23 rotatably mounted on shaft 18 having the interposed bearing bushings 24. A lateral integral extension 25 of spider 23 forms a support for the foam-control assemblies 26. A large horizontal plate 27 on spider 23 extends flush with inlet and outlet turret bottle tables 12 and 15, respectively, and supports the bottles resting in semi-circular bottle pockets formed in a ring 29 secured near the edge of plate 27. A large gear 32 keyed to spider 23 meshes with gears 33 and 34 of the inlet turret 11 and discharge turret 14, respectively, so that gears 32, 33 and 34 operate in synchronism when driven from a common power source, not shown.

As shown in Figs. 1 and 2, the conventional guide frame 36 of the conveyor 11 is supported on base plate 16 and carries a cam support 37, which comprises a socket plate 38 carrying the stem 39 having a cam bracket 40 fixed on its upper end. There are preferably three such cam supports 37, the center support being as described and the other two supports 37 being suitably fastened to base plate 16, and these three supports fixedly carry the crown cam 41, which extends circumferentially part way around foam control machine 13, as shown in Fig. 1, and which has the contour shown in Fig. 4. Also mounted on similar cam supports 37' at a point just ahead of cam 41 in the direction of rotation of machine 13, is an inverted crown cam 43, having the contour shown in Fig. 3.

Referring to Fig. 5, the foam-control head assemblies 26 each comprises a substantially horizontal lever 44 having a collar 51 provided with a cap 52 clamping the head 45 on the end of lever 44 in alignment with a corresponding bottle recess 28. Cap 52 is provided with a lateral stud 54 having a bushing 56 on which is journalled the roller 55, held in place by washer 57 and cotter pin 58. As shown in Fig. 4, lever 44 is pivoted at its inner end on a horizontal pin 47 on bracket 46, which is secured to spider extension 25 by bolts 48 and is urged downwardly by spring 49, so that roller 55 is held against cam 41 when engaging the same. A stop 50 limits the downward movement of lever 44.

Each control head 45 comprises tubular sleeve 59 having shoulders 60 and 61 fixing the said sleeve within collar 51. The upper end of sleeve 59 is recessed axially and is threaded to receive nut 62, which is screwed down to seal gasket 63 against lip 64 of sleeve 59. Gasket nut 65, screwed on the threaded lower end of sleeve 59, positions gasket 66, which may be preferably of rubber and which is adapted to engage the lip of the bottle B so as to seal its communication with the interior of sleeve 59.

Slidably mounted within sleeve 59 is a valve 67, which seats on shoulders 68 when in open position, substantially closing off passage 69. Valve stem 70 extends upwardly through an axial bore and is slidably guided in nut 62, the top of stem 70 resting flush with the surface of nut 62 when the valve 67 is in open position, resting on shoulders 68. A series of small air ducts 72 in valve 67 discharge into valve chamber 71 which opens to the atmosphere through passage 73 in nut 62. Valve ducts 72 are made sufficiently small so as to be readily closed or clogged by foam rising against them, as will be described. It will be observed that when valve 67 is in open position against shoulders 68, an air discharge outlet is provided from the neck A of the bottle B through valve ducts 72, valve chamber 71, and passage 73 to atmosphere. When valve 67 is raised from shoulders 68 to its closed position against nut 62, conical shoulder 74 of valve 67 seats in the conical counterbore 74' in nut 62 to seal 72 against nut 62 so as to provide an airtight closure. When valve 67 is in this raised or closed position, valve stem 70 projects above the surface of nut 62 as shown by the dotted lines in Fig. 5.

While the present invention is adapted for use with any type of foam inducing mechanism, one form of such mechanism is disclosed herein for purposes of illustration. A preferred embodiment thereof is shown in Figs. 2, 6, 7 and 8, and consists of a bottle tapping mechanism. This tapping mechanism follows the cam 41, after the heads 45 have been released thereby for sealing engagement with the mouths of the corresponding bottles B, and includes a supporting bracket 75 bolted to base plate 16 by bolts 75'. Journalled in hubs 77 and 78 on bracket 75 is a vertical shaft 76 carrying at its upper end a shoe 79 fixed thereto by cotter pin 80 and extending laterally into the path described by the valve stem 70 when the latter is raised. Tapping lever 81 and cocking lever 82 are fixed on shaft 76 adjacent its intermediate and lower portions, respectively. A spring 84 connected between lateral extension 85 of tapping lever 81 and extension 86 of bracket 75, urges shaft 76 in a clockwise direction, as seen in Fig. 6 and provides the impact force of tapping lever 81. Cocking lever 82 is normally positioned in the path of a detent 30 fixed on the lower edge of plate 27 and so positioned that it will engage lever 82, tension spring 84 and release lever 82 at the proper time so that the corresponding tapping arm 81 will strike the corresponding bottle B a blow with a predetermined force. Detents 30 are so spaced around the machine that each cocks a lever 82 so as to jar the bottles in succession as they pass by.

While Fig. 1 shows four tapping mechanisms in series used in conjunction with foam-control machine 13, the number of units may vary for treatment of a particular beverage according to the extent of carbonation and temperature of the liquid, the minimum number of units being ascertained by the critical foaming characteristic necessary to purge the container of air. Thus, one such mechanism may be sufficient for a highly carbonated beverage, although each is adapted to provide a gentle tap to prevent overfoaming so that more than one tapping mechanism is usually necessary.

In operation the partially filled containers, such as bottles B are conveyed by conveyor 10 from the filling machine and are transferred to pockets 28 of machine 13 by inlet turret 11. As machine 13 rotates, foam-control assemblies 26 are released by cam 41 and are drawn downwardly by spring 49 so that gasket 66 is sealed against the lip of bottle B, valve 67 resting in open position on shoulders 68 and valve stem 70 does not project about nut 62. As bottles B, each temporarily sealed by a corresponding head 45, advance past the tapping mechanisms, the corresponding detent 30 engages each cocking lever 82 to retreat tapping lever 81. As the tip of the cocking lever 82 slips over the detent 30, spring 84 swings the tapping lever 81 against the corresponding bottle B, thereby causing the bottle to be jarred. The resulting agitation of the beverage releases part of the carbon dioxide entrained therein, which, rising to the surface, forms foam, which in turn rises to displace air from space A through valve ducts 72 to atmosphere through passage 73. When the foam rises sufficiently in response to repeated agitations of the liquid by successive tapping mechanisms, to contact valve 67, the foam clogs the valve ducts 72, so that pressure forms in space A due to continued foaming and this pressure raises valve 67 to close passage 73. Raising of valve 67 is accompanied by raising valve stem 70 above nut 62 so that as bottle B approaches the next tapping mechanism, valve stem 70 engages shoe 79 thereof, thus preventing the release of cocked tapping lever 81 for impact with the bottle B. Shoe 79 delays the release of tapping lever 81 until bottle B passes beyond the range thereof. In this way the foaming of each bottle B is controlled by its own foam, the foam acting to prevent further foaming by disabling the foam-inducing means.

As the air-purged bottles B advance toward discharge turret 14, cam 43 engages the extended valve stems 70 of each control head 45, depressing the same to restore the valves to normal position without disturbing the foam. The excess pressure is relieved through ducts 72. Cam 41 then engages roller 55 of foam control assembly 26, lifting the said assembly from the lip of bottle B and maintaining it in raised position while the bottle, still with foam to its mouth, is transferred by discharge turret 14 and conveyor 10 to the final sealing machine 15.

In the modification illustrated in Figs. 9 and 10, the head 45' is carried by a slide 90 splined at 91 for vertical movement in a sleeve 92 formed on a rotary spider 93. As in the arrangement of Fig. 1, a number of such heads may be provided, each aligned with a vertically-fixed support, not shown, but corresponding to parts 27, 28 in Fig. 1, in which the bottle B' is supported. After the partially-filled bottle B' is placed in alignment with the corresponding head 45', a stationary cam 94, engaged by roller 95 on slide 90, lowers the latter to firmly engage the rubber gasket 96 with the lip of the bottle B' to seal the same.

The gasket 96 is clamped between a flange 97 on bell 98 and an intermediate washer 99, of metal or other firm material, engaging the lower end of a tube 100, which is slidable in slide 90, and carries the bell 98 on its lower end and has a nut 101 at its upper end. A coil spring 102 urges the tube 100 downwardly so that nut 101 rests in the upper end of the slide 90. The purpose of spring 102 is compensation for over or under height bottles B'. Thus, the slide 90 is lowered by cam 94 a greater amount than is necessary to seal gasket 96 for normal height bottles, so that for under height bottles the seal between gasket 96 and the lip of the bottle is assured. For average or greater than average height bottles B', the tube 100 simply recedes, nut 101 lifting from slide 90.

The center bore 103 of the tube 100 normally communicates at its lower end, through the passage 104 in gasket 96 and washer 99, with the interior of bottle B' and at its upper end with a source of suction through flexible tube or hose 105. This communication of tube bore 103 with the source of suction is controlled by valves, not shown, but synchronized with cam 94 so that the suction is turned on after the gasket 96 is sealed with the lip of the bottle B' and is turned off just before arm 94 lifts the slide 90 from the bottle, as will be readily understood. Any mechanism for effecting this action will serve the purpose, such as, for example, a stationary recessed plate 110 connected by pipe 111 to the suction source and cooperating with plate 112 rotating with the machine to connect the tube 105 to and disconnect it from the source of suction at the aforementioned proper timed intervals.

Interposed in the suction line and located in a chamber 106 formed between a counter-bore in the lower end of the plunger 100 and the upper surface of washer 99, is light plunger disc 107 having a diameter slightly less than the diameter of chamber 106 and larger than passage 104. The center 109 of the plunger disc 107 is imperforate, so that it can seal the bore 103 when raised against the end thereof; but in the space between the diameter of bore 106 and the passage 104 there is provided a series of small holes 108 of a size to be clogged by the foam rising through passage 104. The number of holes 108 is selected so that their aggregate area is sufficient to permit the free passage of air therethrough. Holes on the order of about 1/64 to 1/32 of an inch in diameter have been found to be satisfactory for 72 and 108, although the size may vary, depending upon the surface tension of the liquid.

In operation of the modification shown in Figs. 9 and 10, the cam 94 lowers the slide 90 and consequently engages head 45' in sealing engagement with the lip of the bottle B'. The suction source is then connected to the tube 100, so that air is exhausted through passage 104 and holes 108 from the space above the beverage in the bottle B'. As this air is exhausted, the pressure on the liquid is decreased, resulting in the release of gas from the liquid, which causes foam to rise to the lip of the bottle, thereby expelling the remaining air therefrom. The foam enters passage 104 and lodges against the plunger disc 107, thereby clogging the holes 108 therein. The suction, being thus interrupted by plunger disc 107, draws the latter upwardly until the imperforate center portion thereof closes the end of the bore 103, thus stopping the foam induction and inhibiting further foaming. The valve controlling the suction then closes, breaking the suction and cam 94 raises the head 45' from the lip of the bottle, which is then transferred to a sealing station and sealed while the air-excluding foam still extends to the lip thereof, in the manner described in connection with the form of Fig. 1. The plunger disc 107 drops to its position of rest on washer 99, the foam films across the holes 108 therein are broken, and the head 45' is ready to repeat the operation.

While this invention has been described in connection with controlling the foaming of carbonated beverages, it is obvious that the invention may be applied with utility to the purging of air or other gas from the surface of any liquid having the desired foaming characteristic and packaged in any type of receptacle or container. Also, the foam-inducing means may be fluid jetting apparatus, as well as the disclosed suction and tapping mechanisms, so long as foam is induced and is utilized to control the foam-inducing means. It is further to be understood that while preferred embodiments of the structure of the invention have been set forth herein, the invention is not to be limited thereto save as defined in the appended claims.

We claim:

1. The method of purging air from a partially-filled carbonated beverage container, which comprises treating the beverage to cause it to release gas to form foam rising in the container for expelling air from the space above the liquid therein, directly utilizing the engagement of the rising foam with a control element adapted to control the further foam-inducing treatment of the beverage, and then sealing the container.

2. The method of purging air from a partially-filled carbonated beverage container, which comprises treating the beverage to cause it to release gas to form foam rising in the container for expelling air from the space above the liquid therein, directly utilizing the engagement of the rising foam with a control element at a predetermined level above the liquid in the container to stop the foam-inducing treatment, and then sealing the container.

3. The method of purging air from a partially-filled carbonated beverage container, which comprises treating the beverage in the container to cause it to release gas to induce foaming up to a predetermined level above the liquid, utilizing the foam at that level to completely seal the container to allow gas pressure to rise therein as the result of continued foaming, utilizing the said gas pressure in the container to control the foam-inducing treatment, and then sealing the container.

4. The method of purging air from a partially-filled carbonated beverage container, which comprises treating the beverage in the container to cause it to release gas to induce foaming up to a predetermined level above the liquid, utilizing the foam at that level to completely seal the container to allow gas pressure to rise therein as the result of continued foaming, utilizing the said gas pressure in the container to stop the foam-inducing treatment, and then sealing the container.

5. The method of purging air from a partially-filled carbonated beverage container, which comprises partially closing the container temporarily, treating the beverage in the container to cause it to release gas to induce foaming up to a predetermined level above the liquid, utilizing the foam at that level to completely seal the container to allow gas pressure to rise therein as the result of continued foaming for quieting said continued foaming, releasing the temporary seal from the container, and then permanently sealing the container.

6. The method of packaging beverages containing carbon-dioxide, which comprises partially filling a container with the beverage, the space above the liquid level in the container containing air, treating the beverage in the container to cause it to release gas to induce foaming for expelling at least part of the air from the container, directly utilizing the engagement of the rising foam with a control element to control the foam-inducing treatment, and then sealing the container while substantially purged of air.

7. The method of packaging beverages containing carbon dioxide, which comprises partially filling a container with the beverage, the space above the liquid level in the container containing air, agitating the beverage in the container to induce foaming thereof for expelling at least part of the air from the container, utilizing the said foaming to control the foam-inducing agitation, and then sealing the container while substantially purged of air.

8. The method of packaging beverages containing carbon dioxide, which comprises partially filling a container with the beverage, the space above the liquid level in the container containing air, reducing the pressure on the surface of the beverage in the container to cause it to release gas to induce foaming for expelling at least part of the air from the container, directly utilizing the engagement of the rising foam with a control element to control the said pressure reduction, and then sealing the container while substantially purged of air.

9. In apparatus for purging air from a partially-filled carbonated beverage container, the combination of a support for the container, means to cause the beverage to release gas for inducing foaming of the beverage in the container to expel at least part of the air from the space above the liquid in the container, means responsive to the foaming for controlling the foam-inducing action of said first means, and means for sealing the container.

10. In apparatus for purging air from a partially-filled carbonated beverage container, the combination of suction means connected to the mouth of the container for reducing pressure therein and thus inducing foaming of the beverage in the container to expel at least part of the air from the space above the liquid in the container, means responsive to the foaming for controlling the foam-inducing suction, and means for sealing the container.

11. In apparatus for purging air from a partially-filled carbonated beverage container, the combination of a support for the container, means to cause the beverage to release gas for inducing foaming of the beverage in the container to expel at least part of the air in the space above the liquid in the container, means responsive to the rise of the foam to a predetermined level above the liquid in the container for controlling the foam-inducing means, and means for sealing the container.

12. In apparatus for purging air from a partially-filled carbonated beverage container, the combination of a support for the container, means to cause the beverage to release gas for inducing foaming of the beverage in the container to expel at least part of the air from the space above the liquid in the container, means responsive to the rise of the foam to a predetermined level above the liquid in the container for sealing the container to allow gas pressure to rise therein as the result of continued foaming, means actuated by said gas pressure in the container, operative connections between said last means and said first means for controlling the foam-inducing action of the latter, and means for sealing the container.

13. In apparatus for purging air from a partially-filled carbonated beverage container, the combination of a support for the container, an apertured closure for the container adjacent the support, means for applying said closure to the container, means for inducing foaming of the beverage in the container to expel at least part of the air from the space above the liquid in the container, the aperture in the closure being sealable by the foam film rising in the container, whereby the gas pressure in the container rises as the result of continued foaming, means actuated by said gas pressure in the container for controlling the foam-inducing means, and means for sealing the container.

14. In apparatus for purging air from a partially-filled carbonated beverage container, the combination of a support for the container, a closure for the container mounted adjacent the support and having a passage, means for applying said closure to the container, means adjacent the support for inducing foaming of the beverage in the container to expel through said passage at last part of the air from the space above the liquid in the container, means in the closure passage responsive to the rise of the foam to a predetermined level in the container for closing the passage to allow the gas pressure due to the foaming to increase in the container and thus quiet the foaming, means for removing said closure, and means for then sealing the container.

15. In apparatus for purging air from a partially-filled carbonated beverage container, the combination of a support for the container, a closure for the container mounted adjacent the support and having a passage, means for applying said closure to the container, means adjacent the support for inducing foaming of the beverage in the container to expel through said passage at least part of the air from the space above the liquid in the container, a movable member in the passage for closing the same in response to a predetermined pressure in the container resulting from the release of the gas during foaming, operative connections between said member and the foam-inducing means for controlling the latter, means for removing said closure, and means for then sealing the container.

16. In apparatus for purging air from a partially-filled carbonated beverage container, the combination of a support for the container, a closure for the container mounted adjacent the support and having a passage, means for applying said closure to the container, means adjacent the support for inducing foaming of the beverage in the container to expel through said passage at least part of the air from the space above the liquid in the container, said closure passage having a size sealable by the foam film to allow gas pressure to rise in the container as the result of the continued foaming, means responsive to the gas pressure in the container for controlling said foam-inducing means, means for removing said closure, and means for then sealing the container.

17. In apparatus for purging air from a partially-filled carbonated beverage container, the combination of a closure for the container mounted adjacent the support and having a passage connected to a source of suction, means for applying said closure to the container for inducing foaming of the beverage in the container by the suction to expel at least part of the air from the space above the liquid in the container, a valve in said passage having an aperture sealable by the foam film to allow the suction to actuate the valve to seal the passage and thereby stop the foam-inducing suction, means for removing said closure, and means for then sealing the container.

18. In apparatus for purging air from a partially-filled carbonated beverage container, the combination of a support for the container, a closure for the container mounted adjacent the support and having a passage, means for applying said closure to the container, a source of suction, means for connecting said source of suction to said passage for inducing foaming of the beverage in the container to expel through said passage at least part of the air from the space above the liquid in the container, a valve in said passage having an aperture sealable by the foam film to allow the suction to actuate said valve to seal the passage and thereby stop the foam-inducing suction, means for disconnecting said source of suction from said passage to break the suction thereon, means for removing said closure, and means for then sealing the container.

CHARLES SCHMUTZER.
KURT MANRODT.